(12) United States Patent
Mihocka et al.

(10) Patent No.: US 7,752,028 B2
(45) Date of Patent: Jul. 6, 2010

(54) SIGNED/UNSIGNED INTEGER GUEST COMPARE INSTRUCTIONS USING UNSIGNED HOST COMPARE INSTRUCTIONS FOR PRECISE ARCHITECTURE EMULATION

(75) Inventors: Darek Mihocka, Mercer Island, WA (US); Jens Troeger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/828,364

(22) Filed: Jul. 26, 2007

(65) Prior Publication Data
US 2009/0030668 A1   Jan. 29, 2009

(51) Int. Cl.
G06F 9/445 (2006.01)
(52) U.S. Cl. .......................... 703/22; 703/24; 712/209; 712/227; 712/244; 713/324
(58) Field of Classification Search .................... 703/22, 703/24; 712/209, 227, 244; 713/324
See application file for complete search history.

(56) References Cited

U.S. PATENT DOCUMENTS

| | | | |
|---|---|---|---|
| 4,888,722 A | 12/1989 | Boreland | |
| 5,805,918 A * | 9/1998 | Blomgren et al. | 712/43 |
| 5,917,739 A | 6/1999 | Wong | |
| 6,018,751 A | 1/2000 | He | |
| 6,237,085 B1 | 5/2001 | Burns et al. | |
| 6,367,066 B1 | 4/2002 | Sato | |
| 6,516,332 B1 | 2/2003 | Carter | |
| 6,658,578 B1 * | 12/2003 | Laurenti et al. | 713/324 |
| 6,934,832 B1 * | 8/2005 | Van Dyke et al. | 712/244 |
| 7,047,394 B1 * | 5/2006 | Van Dyke et al. | 712/209 |
| 7,065,633 B1 * | 6/2006 | Yates et al. | 712/227 |
| 2004/0010536 A1 | 1/2004 | Moreno et al. | |
| 2004/0068642 A1 | 4/2004 | Tanaka et al. | |
| 2004/0073773 A1 | 4/2004 | Demjanenko | |
| 2006/0224646 A1 | 10/2006 | Kishore et al. | |
| 2006/0253521 A1 | 11/2006 | Sadafale | |
| 2007/0083584 A1 | 4/2007 | Dybsetter | |

OTHER PUBLICATIONS

Mading, et al., "The Vector Fixed Point Unit of the Synergistic Processor Element of the Cell Architecture Processor", EDAA, 2006, pp. 244-248.
Stanek, "Vector Processing and Altivec", pp. 3.
Taylor, "64-bit PowerPC ELF Application Binary Interface Supplement 1.9", IBM Corporation, 2004, pp. 1-66.

* cited by examiner

Primary Examiner—Thai Phan

(57) ABSTRACT

Architecture for efficient translation and processing of PowerPC guest instructions on an x86 host machine. In an x86-based architecture, signed integer values are projected into the unsigned integer value space for processing by the host using the negation of the left-most (sign) bit. Compare operations are performed in the unsigned space and the compare results are written into the host flags register. Once the compare results are written into the host flags register, the flag values can be read out and used in a table lookup to retrieve the corresponding values for the guest register. The guest flag values are then passed into the guest flags register for processing by the guest application.

20 Claims, 8 Drawing Sheets

SIGNED/UNSIGNED INTEGER GUEST COMPARE INSTRUCTIONS USING UNSIGNED HOST COMPARE INSTRUCTIONS FOR PRECISE ARCHITECTURE EMULATION

BACKGROUND

Computers are becoming a necessity in day-to-day business and user activities. This not only includes the typical desktops and portable computers, but devices that also use processors for application execution such as smart phones, for example. There are only a few processor architectures that have survived in the cut-throat computer business, and which account for the bulk of the millions of computers in use today.

Because of this mix of processor architectures, software vendors design and sell software for use on one or more of these processor architectures. This can be an expensive proposition so vendors typically will focus on the architecture that offers the most return on the investment. It is not uncommon for a user to prefer to run an application designed for one architecture on a different computer architecture. Such an example includes running an application designed for a PowerPC™ processor architecture on an x86-based processor architecture.

In order to accomplish this, the host machine (e.g., the x86 machine) will need an emulator to convert the guest instructions (of the PowerPC) to x86-based host instructions, and to provide a PowerPC execution environment for the converted guest instructions. The guest instruction set (e.g., the PowerPC instruction set) has a group of instructions that need to be translated down to be executed by the host. In other words, instructions can work differently on different architectures. If the translation process from guest to host is slow, this will translate into sluggish performance of the guest application and system overall making the user experience less than desirable.

One of the many challenging aspects of the translation process is to translate compare instructions. The PowerPC has dedicated instructions for signed and unsigned integer compares, each of which represents the result of the comparison by setting and clearing three status bits: "greater than", "less than", and "equal". Conditional branch instructions then branch by testing these bits. The x86 host, in contrast, provides only one compare instruction that computes the results for both signed and unsigned integer compares and represents the result of the comparison by setting and clearing four status bits: "carry" (for unsigned integer values), "zero", and "sign" and "overflow" (for signed integer values). These four bits are spread out over two 8-bit bytes of a flags register.

Given that instruction compares and conditional branches occur very frequently, poor performance at this level means reduced performance at the guest application level if these operations cannot be handled quickly.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides efficient translation and processing of guest instructions on a host machine. Where the host machine is an x86-based architecture, signed integer values are projected into the unsigned integer value space for processing by the host using the negation of the left-most (sign) bit. In a host x86-based architecture efficiently reading of bits in the flags register is the focus. Requiring a 16-bit read operation of the flags register is slow compared to an 8-bit read of the register. Thus, it is desirable to avoid 16-bit reads. The 16-bit read operation is typically required when handling signed integer values, but not when handling unsigned integer values. Accordingly, it is faster to operate only on the unsigned integer value, such that only the lower eight bits of the flags register require processing.

In operation, the host performs a bit-logical XOR on a guest signed integer value to project the signed value into unsigned value space. Although the integer value changes, the relative values between the two integers do not. This is important in an arithmetic compare operation. The compare operation is then performed in unsigned space, which only affects the lower eight bits of the flags register. Once the compare results are written into the host flags register, the flag values can be read out and used in a table lookup to retrieve the corresponding values for the guest register, if need be. The guest flag values are then passed into the guest flags register for processing by the guest application.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
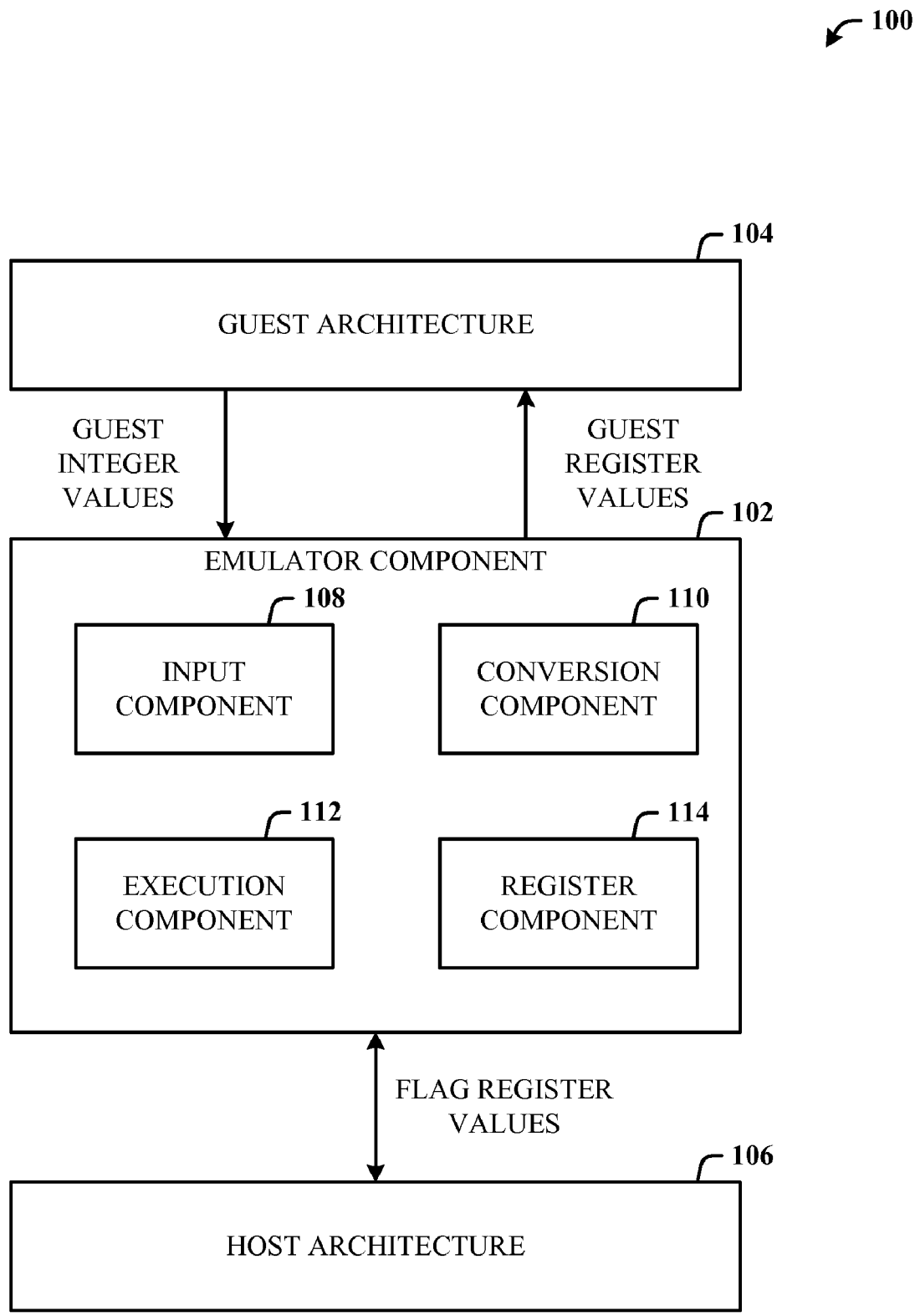
FIG. 1 illustrates a computer-implemented emulation system for processing guest instructions.

The disclosed emulation architecture provides enhanced efficiency when faced with handling guest compare (CMP) instructions on a host machine for PowerPC-on-x86 emulation. This will be described in detail where guest signed integer values, which if processed directly, would require 16-bit flag operations, are converted into unsigned integer values, which only use 8-bit flag operations on the host. Reading only the lower eight bits of the EFLAGS register is much more efficient than reading the sixteen bits of the EFLAGS register. This is illustrated by the code for the "second approach" described below that employs better performance using pushf and pop instructions and the use of lahf instructions in the exemplary code of FIG. 4. Arithmetic compare processing is then performed by the host, the results of which are pushed into the x86 EFLAGS register, and the flag values of the EFLAGS register are used for translation into flags of the guest flags register. The guest application can then perform branching (e.g., conditional) quickly, as needed, based on the flag values in the guest flags register.

The x86 architecture includes a flags register which contains the processor state of results of arithmetic instructions. The flags register was originally designated the FLAGS register for 16-bit implementations, expanded for 32-bit implementations (and designated EFLAGS), and further expanded for 64-bit implementations (and designated RFLAGS). The wider registers retain compatibility with the smaller predecessors. Note that reference to the host or x86 architecture flags register is intended to encompass operations in the lower eight and sixteen bits in 16-bit, 32-bit, 64-bit, etc., architectures. Flags are used in the x86 architecture to reflect the results of integer arithmetic instructions. Important flags in the flags register (for the purposes disclosed herein) are in the two lower 8-bit bytes. The lowest byte includes a carry flag (bit 0), a zero flag (bit 6), a sign flag (bit 7), and next upper byte includes an overflow flag (bit 11).

The PowerPC architecture includes a condition register (CR) that consists of eight fields (CR0-CR7), where a field is a segment of four bits used to store status information about the results of an arithmetic integer instruction. The CR0 ... 7 field is a 4-bit field that employs flags for compare operations such as less than (LT), greater than (GT), equal (EQ), and summary overflow (SO).

Guest instructions of a PowerPC-based architecture use instructions that are not directly translatable into x86-based instructions. Thus, PowerPC-type applications to be run on the x86 architecture need emulation. What is desired is a fast implementation of the guest instructions between the guest architecture and host architecture.

A naïve approach to translate PowerPC guest compare instructions to the x86 host is the explicit comparison and generation of the exact guest flags, exemplified by the following code.

```
UINT32 Exec::CrCompU(UINT64 qw1, UINT64 qw2)
{
    UINT32 cr = 0;
    if (qw1 < qw2)
        BDSET_(cr,4,CR_BIT_LT);
    else if (qw1 > qw2)
        BDSET_(cr,4,CR_BIT_GT);
    else
        BDSET_(cr,4,CR_BIT_EQ);
    if (XER_GET(XER_BIT_SO))
        BDSET_(cr,4,CR_BIT_SO);
    return(cr);
}
UINT32 Exec::CrCompS(UINT64 qw1, UINT64 qw2)
{
    UINT32 cr = 0;
    if ((SINT64)qw1 < (SINT64)qw2)
        BDSET_(cr,4,CR_BIT_LT);
    else if ((SINT64)qw1 > (SINT64)qw2)
        BDSET_(cr,4,CR_BIT_GT);
```

-continued

```
    else
        BDSET_(cr,4,CR_BIT_EQ);
    if (XER_GET(XER_BIT_SO))
        BDSET_(cr,4,CR_BIT_SO);
    return(cr);
}
```

However, the impact of these functions on the performance of the emulator is huge. A second approach simply stores the entire host EFLAGS register (for a 32-bit implementation) with each comparison, marks whether the comparison was a signed or unsigned operation, and then implements guest conditional branches based on the stored information. This is exemplified by the following code.

```
; assume the values that are compared are in rax and rcx
cmp     rax, rcx
pushf
pop     eax
mov     < CR register flags >, eax
mov     < CR register signed/unsigned >, 1
; conditional branches then do the following:
mov     eax, < CR register flags >
push    eax
popf
cmp     < CR register signed/unsigned >, 1
je      @signed
...
```

However, although the second approach is faster than the naïve approach, the second approach is still expensive because of the slow instructions that access the entire x86-based EFLAGS register, and because of additional control flow to implement signed/unsigned results.

The disclosed architecture projects signed integer values into the unsigned integer value space using the negation of the left-most (sign) bit, uses the "carry" and "zero" bits only for both signed and unsigned integer compares, implements both signed and unsigned integer compares using results of unsigned compares, restores the guest registers values using a table lookup method, and thereby facilitates fast branching based on simple tests.

Note that although the following description will be in the context of a PowerPC architecture and an x86 architecture, it is to be appreciated that the novel methods described herein also apply to other guest/host relationships where the host can apply more efficient integer value processing in one space over another.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented emulation system 100 for processing guest instructions. The system 100 includes an emulation component 102 for emulating a suitable guest architecture 104 on a host architecture 106. This situation arises when an application (as part of the guest architecture 104) designed for one architecture (e.g., PowerPC-based) is allowed to load and run on a different host architecture (e.g., x86-based).

In support thereof, the emulator component 102 can include instructions described in terms of components for providing emulation in the desired manner. For example, the emulator component 102 can include an input component 108 for receiving guest signed integer values and unsigned integer values associated with a guest compare instruction. A conversion component 110 converts the signed integer values into unsigned integer values. An execution component 112 then executes a compare operation on the unsigned integer values using the host architecture compare instructions, and a register component 114 restores guest register values based on the x86-based compare results.

Figure 2:
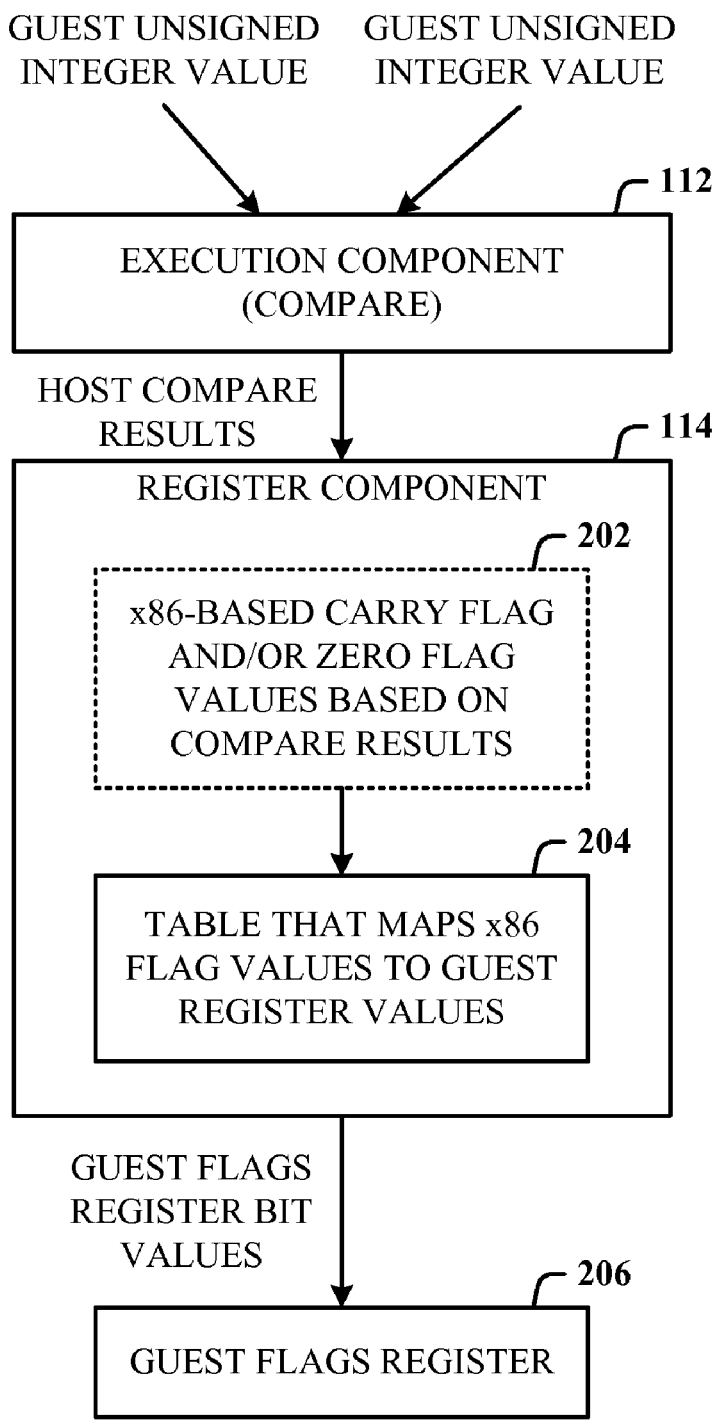
FIG. 2 illustrates a system that includes a table lookup process based on host flag values and guest flag values.

FIG. 2 illustrates a system 200 that includes a table lookup process based on host flag values and guest flag values. The execution component 112 receives guest signed integer values, executes a host compare operation, and passes the host compare results to the register component 114. The register component 114 translates the compare results into flag values 202 using only the x86-based carry flag and/or the zero flag. The compare result is defined using only the x86-based carry flag (CF) and/or the x86-based zero flag (ZF). The register component 114 can include a table that maps the lower 8-bit x86 flag values (CF and ZF) to guest flag values (e.g., PowerPC condition register CR0 . . . 7 field). Based on the host flag values created from the compare results, a table lookup process returns the associated guest flags register bit values that are returned to a guest flags register 206. The guest application can then read these guest flag values to execute conditional branching.

Figure 3:
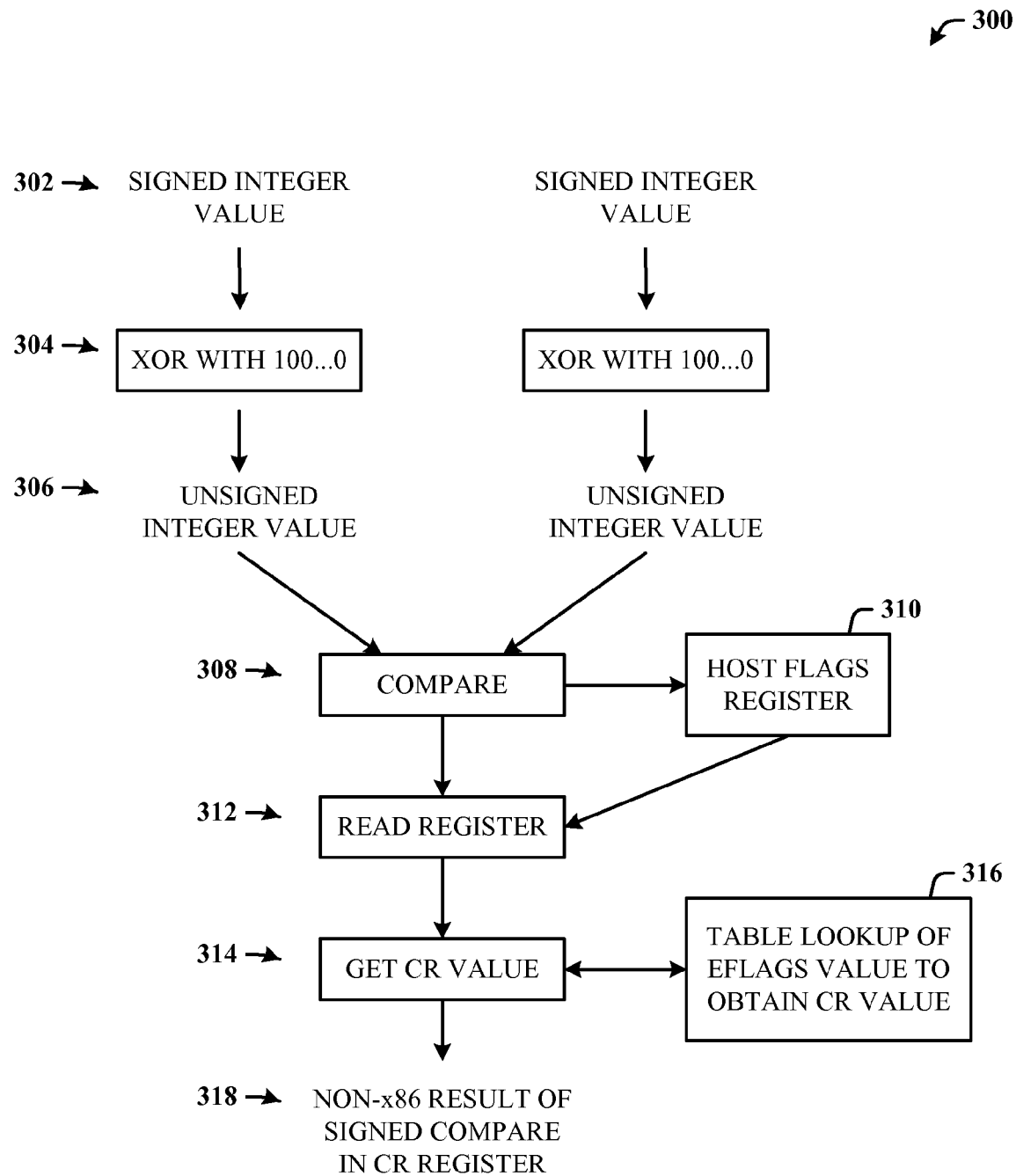
FIG. 3 illustrates a flow diagram from receipt of PowerPC signed integer values to PowerPC results for a guest flags register.

FIG. 3 illustrates a flow diagram 300 from receipt of PowerPC signed integer values to PowerPC results for a guest flags register. At 302, non-x86-based signed integer values are received. At 304, the signed values are XOR'd with binary $10000000_2$ to negate the signed value's sign. At 306, the result of the XOR process is interpreted as an unsigned integer value. At 308, an x86 compare instruction compares the two unsigned integer values to obtain a compare result. The compare result is converted into flag values (e.g., CF and ZF) for a host flags register 310. At 312, the lower 8-bit byte of the host flags register 310 is then read. At 314, the guest flags register values (for the condition register (CR)) are obtained via a table lookup process 316. At 318, the PowerPC guest flags register values are written out (e.g., to the guest application).

Figure 4:
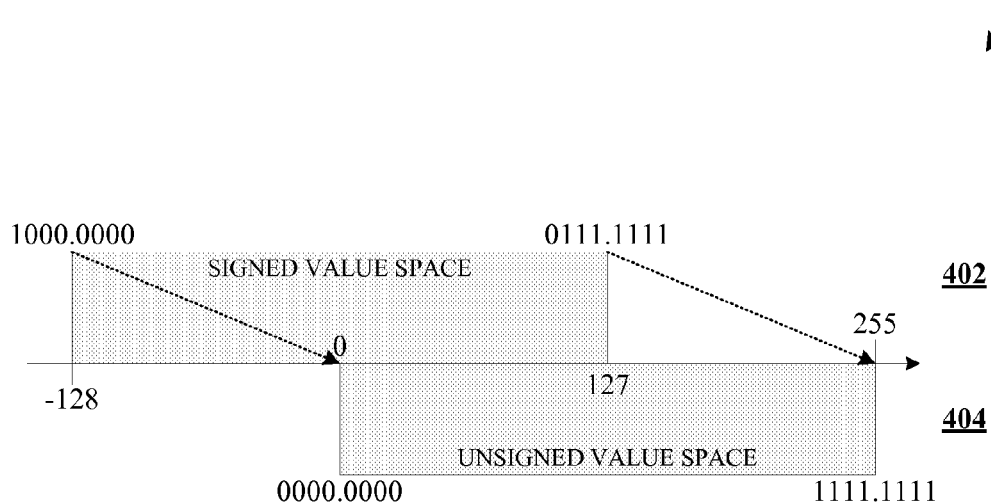
FIG. 4 illustrates the quick process for projecting signed integer values to equivalent values in the unsigned integer space.

FIG. 4 illustrates the quick process 400 for projecting signed integer values to equivalent values in the unsigned integer space. The signed integer byte space 402 ranges from 0x80 . . . 0x7f (−128 . . . +127) and the unsigned integer byte space 404 ranges from 0x00 . . . 0xff (0 . . . 255). In binary form, the unsigned integer byte space ranges from 00000000 . . . 11111111 and the signed integer byte space from 10000000 . . . 01111111. For every byte value that is interpreted as a signed integer value, the negation of the left-most bit (the sign bit) produces a byte value that when interpreted as an unsigned byte value, is in the unsigned integer value space equivalent to the signed value in the signed integer value space. Negating the left-most bit can be performed by XOR'ing the integer byte value with $10000000_2$ (or 0x80 h).

Based on this observation, signed comparisons of guest values can be implemented on the host using the results of the unsigned compare simply by negating the left-most bit of the signed operands. This not only eliminates the expensive retrieval of the complete host flags register value (e.g., EFLAGS register), but also eliminates the need to maintain extra state to distinguish between signed and unsigned comparisons when the results of the compares are used. The unsigned compares are now trivial, as exemplified by the following code.

```
; assume the values that are compared are in rax, rcx
cmp     rax, rcx
lahf
mov     < CR register flags >, ah
```

The code indicates that the guest unsigned integer values have been stored in registers rax and rcx, and that a compare instruction (cmp) processes a compare of the two register values. The lahf instruction (load status flags into AH register) is a fast instruction that reads out the lower 8-bit byte of the host flags register, rather than the lower two bytes, and stores the lower byte into an AH register. The contents of the AH register are then moved into the CR register implementation (for the guest).

The signed compare process then requires only a small addition relative to the unsigned compare above, as exemplified by the following code.

```
; assume the values that are compared in rax, rcx
mov     rdx, 0x8000000000000000
xor     rax, rdx
xor     rcx, rdx
lahf
mov     < CR register flags >, ah
```

The time involved for processing an XOR instruction and an LAHF instruction is less than the time required for a signed compare and a 16-bit read.

Not only is this code sequence much more performant and requires no additional state, the use of the state by guest conditional branches is trivial as well, as illustrated below.

```
test    < CR register flags >,  0x01 ;  or 0x40,  or 0x41
jz/jnz  @destination
```

The restoration of the guest CR register is also very fast when using a table that maps flag values stored by the above sequence to equivalent guest values.

Figure 5:
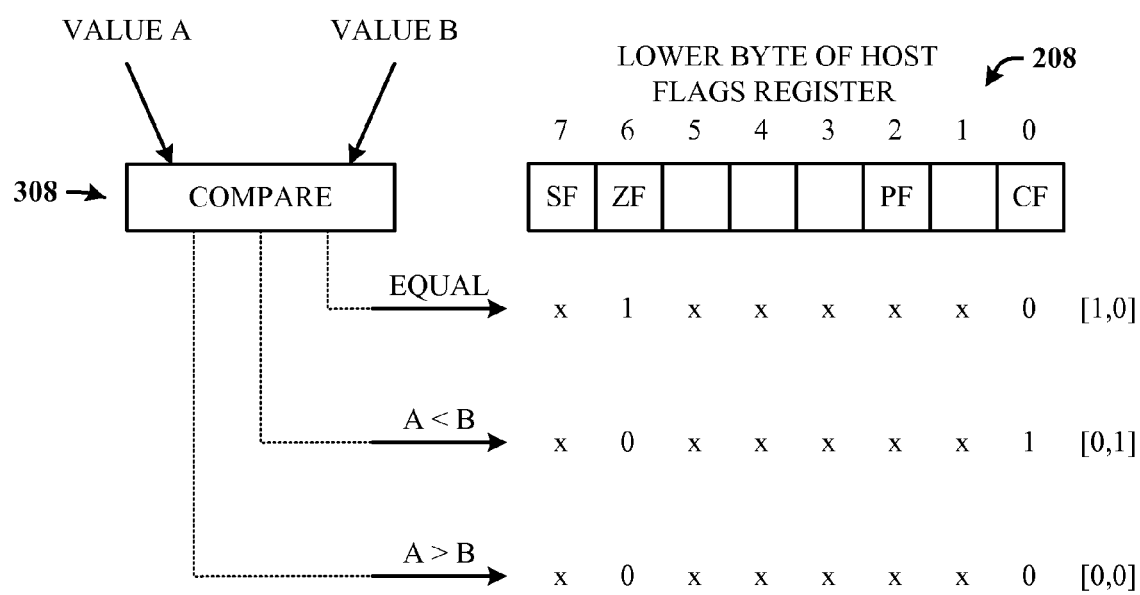
FIG. 5 illustrates a diagram showing one exemplary bit pattern that can be employed for maintaining process state in host and guest flags registers.

FIG. 5 illustrates a diagram 500 showing one exemplary bit pattern that can be employed for maintaining process state in host and guest flags registers. Here, two values (Value A and Value B) can undergo an x86-based compare operation 502. The outcome of the compare operation 502, the result is stored in the lower byte of the x86 flags register 208. In particular, the state can be captured using only two bits such as the zero flag (ZF) and the carry flag (CF) bit places. Other register bit places can be ignored for this purpose. In this example, if the compare result is such that Value A is equal to Value B, the ZF bit is set and the CF bit is zero. If the result is that A is less than B, then the ZF bit is cleared and the CF bit is set. If the result is that A is greater than B, then both the ZF bit and the CF bit are cleared. Thus, based on this 2-bit value of [1,0], [0,1] or [0,0], a translation process using a table lookup can be performed that translates the 2-bit value to a 3-bit value of [LT,GT,EQ] used in the guest flags register field (e.g., CR field CR7).

Figure 6:
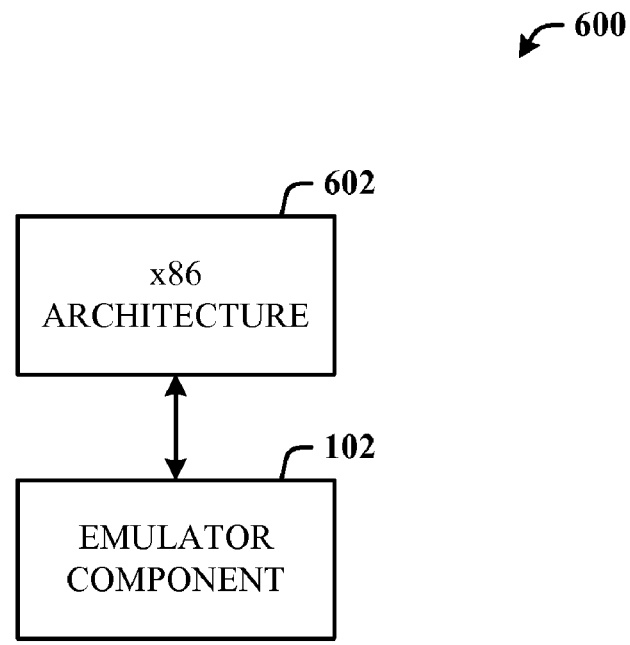
FIG. 6 illustrates a system where the emulator component can be employed as an external entity to an x86 architecture.
Figure 7:
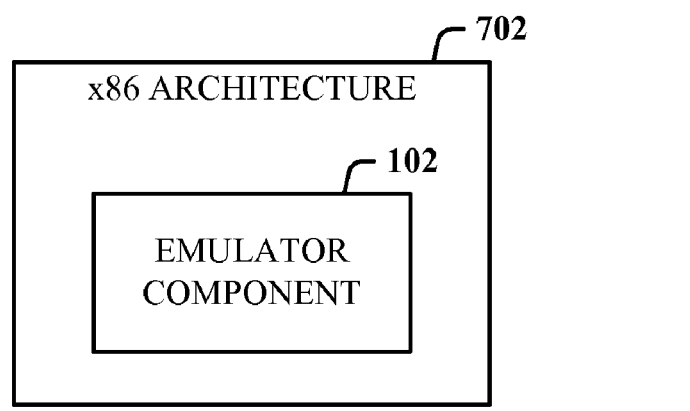
FIG. 7 illustrates a system where the emulator component can be employed as an internal entity to an x86 architecture.

FIG. 6 illustrates a system 600 where the emulator component 102 can be employed as an external entity to the on-chip circuitry of an x86 architecture 602. FIG. 7 illustrates a system 700 where the emulator component 102 can be employed as an internal entity to the on-chip circuitry of an x86 architecture 702.

Following are a series of flow charts in support of methods of providing various aspects of the emulation architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
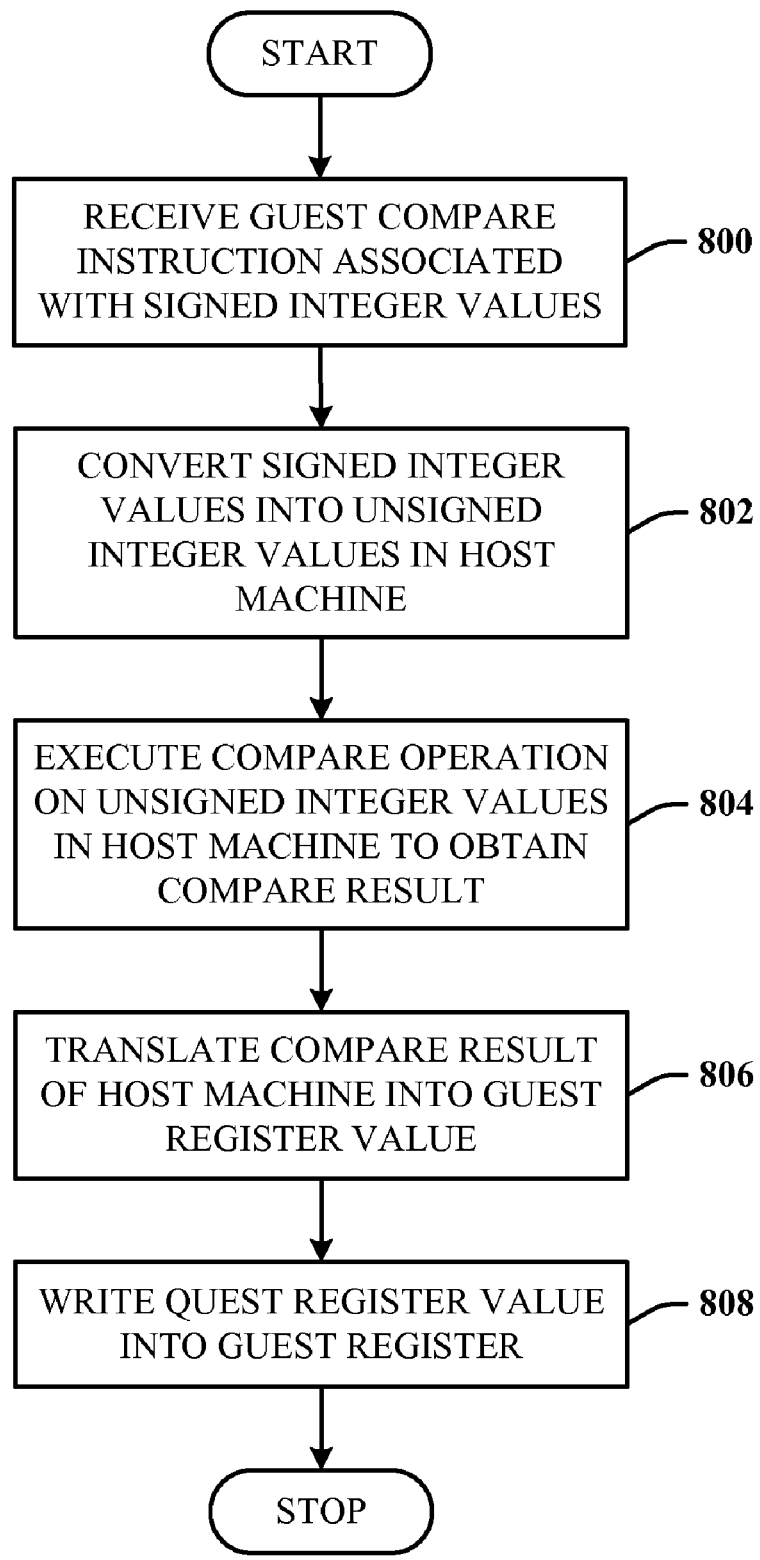
FIG. 8 illustrates a computer-implemented method of emulation processing.

FIG. 8 illustrates a computer-implemented method of emulation processing. At 800, a guest compare instruction associated with signed integer values is received. At 802, the signed integer values are converted into unsigned integer values in a host machine. At 804, a compare operation is executed on the unsigned integer values in the host machine to obtain a compare result. At 806, the compare result of the host machine is translated into a guest register value. The guest register value can then be written to a guest register for use by other processes, as indicated at 808.

Figure 9:
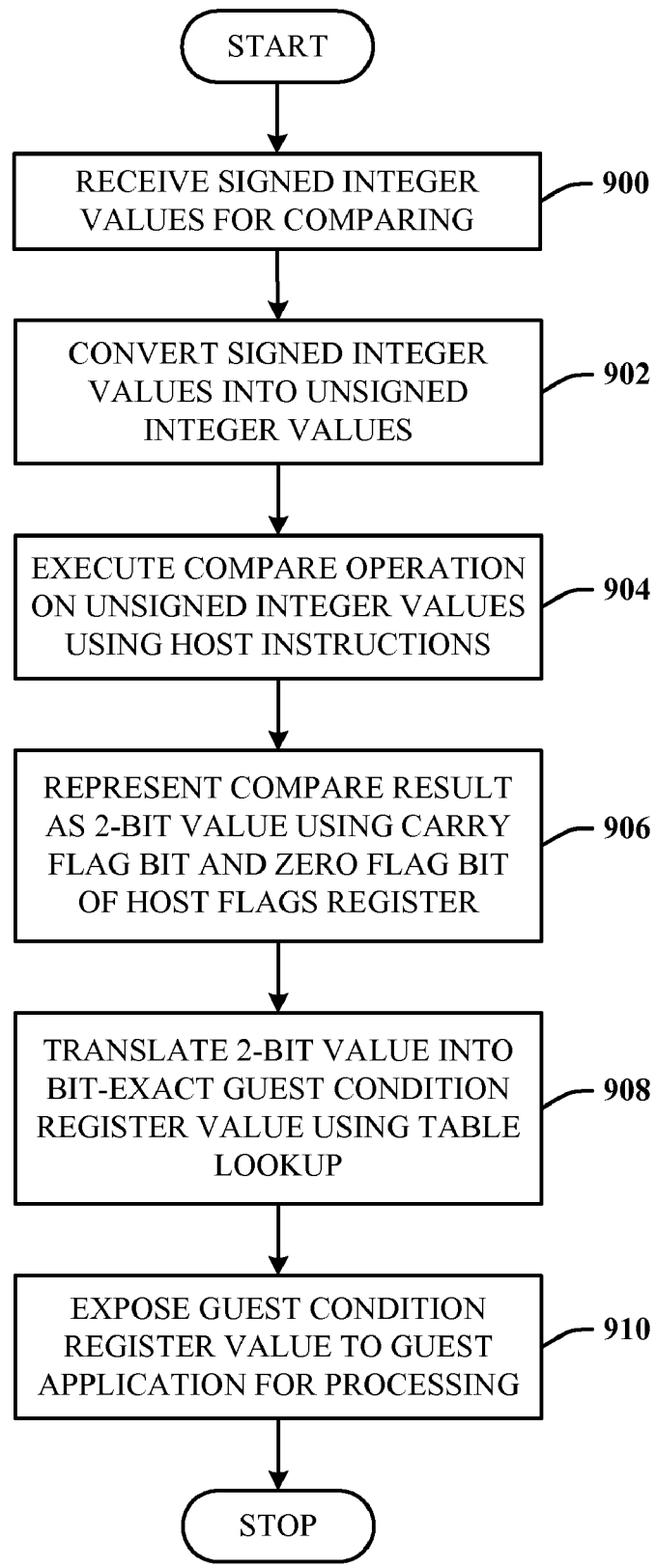
FIG. 9 illustrates a method of employing bit-exact emulation for guest/host instruction processing.

FIG. 9 illustrates a method of employing bit-exact emulation for guest/host instruction processing. At 900, signed integer values are received for comparing. At 902, the signed integer values are converted into unsigned integer values. This is to move from 16-bit compare operations in the host to 8-bit processing. At 904, the compare operation is executed on the unsigned integer values using the host instructions. At 906, the compare result is represented as a 2-bit value using a carry flag bit and a zero flag bit of a host flags register. At 908, the 2-bit value is translated into a bit-exact guest condition register value using a table lookup operation. At 910, the guest condition register value is exposed to a guest application for processing.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
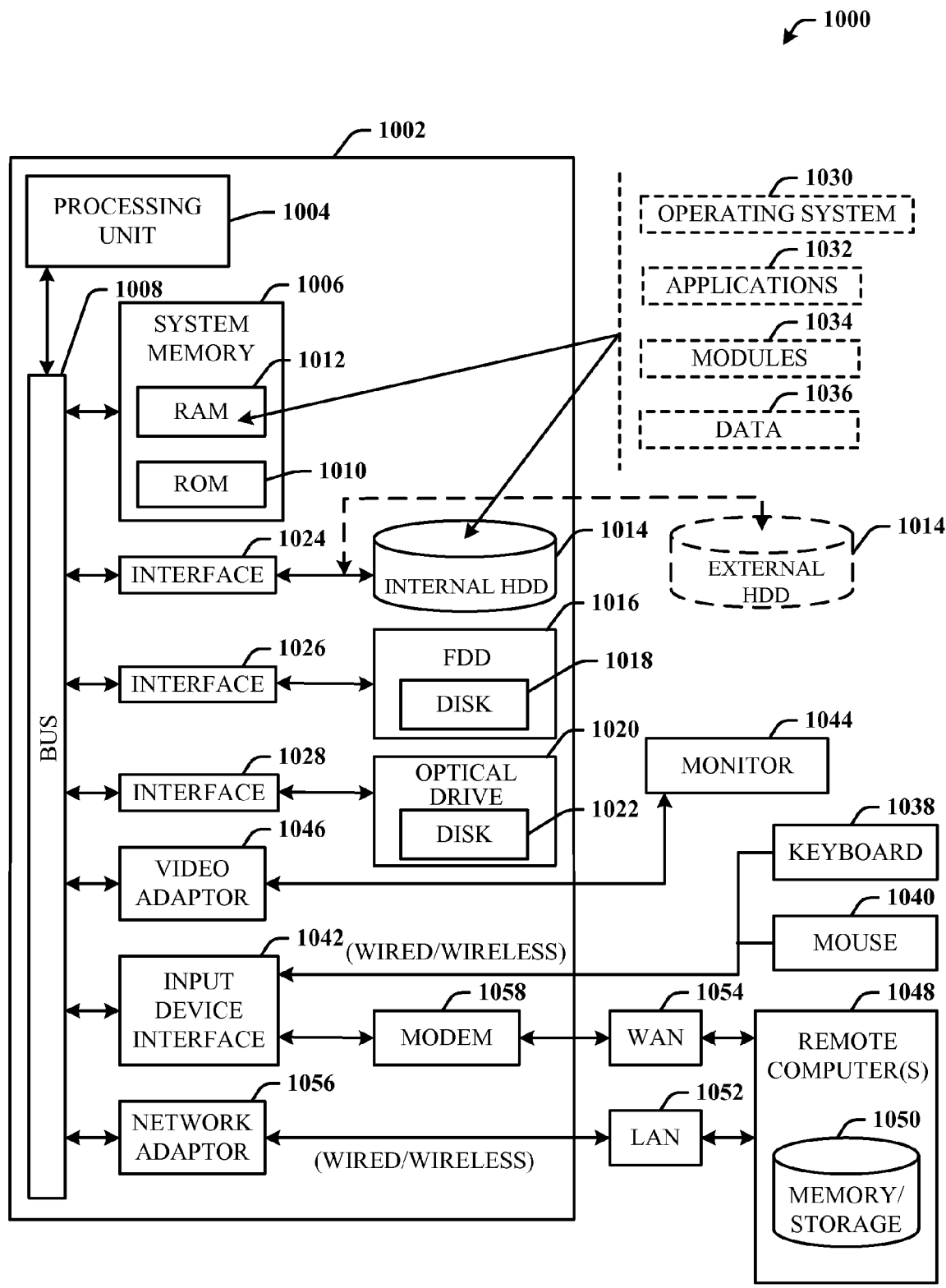
FIG. 10 illustrates a block diagram of a computing system operable to execute non-x86 emulation in accordance with the disclosed architecture.

Referring now to FIG. 10, there is illustrated a block diagram of a computing system 1000 operable to execute non-x86 emulation in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034 and program data 1036 can include the input component 108, conversion component 110, execution component 112, register component 114, guest application 104, host architecture 106, table 204, and flags registers (206 and 310), for example.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An emulation system, comprising:
    a conversion component of a host architecture for converting signed integer values from a guest architecture into unsigned integer values;
    an execution component of the host architecture for executing a compare operation on the unsigned integer values using the host architecture to obtain a compare result; and
    a register component of the host architecture for restoring guest register values based on the compare result.

2. The system of claim 1, wherein the conversion component toggles a sign bit of the signed integer values using a logical XOR operation.

3. The system of claim 1, wherein the compare result is processed faster in unsigned value space than in signed value space.

4. The system of claim 1, wherein the register component stores the compare result as an x86-based flags register value.

5. The system of claim 4, wherein the flags register value is based on two bit places in a lowest byte of an x86-based flags register.

6. The system of claim 1, wherein the host architecture is x86-based and the guest application is PowerPC-based.

7. The system of claim 1, wherein the register component restores the guest register values based on a translation of two bits of a host flags register to three bits of the guest register values.

8. The system of claim 7, wherein the guest register values are stored in a guest condition register.

9. The system of claim 7, wherein the two bits are represented as the guest register values based on a lookup operation in a table that maps host flags register values to guest flags register values.

10. A computer-implemented method of emulation processing, comprising:
receiving guest compare instruction associated with signed integer values;
converting the signed integer values into unsigned integer values in a host machine;
executing a compare operation on the unsigned integer values in the host machine to obtain a compare result; and
translating the compare result of the host machine into a guest flags register value.

11. The method of claim 10, wherein the compare result facilitates a table lookup operation that obtains flag values for a guest application.

12. The method of claim 10, further comprising performing a logical XOR operation on the signed integer values to change a sign bit.

13. The method of claim 10, further comprising storing the compare result in a host flags register.

14. The method of claim 13, wherein the compare result is represented in a lowest byte of the host flags register using a carry flag bit.

15. The method of claim 13, wherein the compare result is represented in a lowest byte of the host flags register using a zero flag bit.

16. The method of claim 10, further comprising receiving a guest compare instruction associated with guest unsigned integer values and executing a host compare operation on the guest unsigned integer values.

17. The method of claim 10, further comprising processing guest conditional branch instruction based on the guest flags register value.

18. A computer-implemented system, comprising:
computer-implemented means for receiving guest compare instruction associated with signed integer values;
computer-implemented means for converting the signed integer values into unsigned integer values in a host machine;
computer-implemented means for executing a compare operation on the unsigned integer values in the host machine to obtain a compare result; and
computer-implemented means for translating the compare result of the host machine into a guest register value.

19. The system of claim 18, further comprising computer-implemented means for converting the compare result into a 3-bit guest value based on flag values of a host flags register.

20. The system of claim 18, wherein the guest compare instruction is from a PowerPC guest application and the host machine is an x86-based architecture.

* * * * *